Jan. 16, 1940.　　　　F. F. UEHLING　　　　2,187,369
AUTOMATIC SPEED REGULATOR
Filed Nov. 16, 1937　　　　2 Sheets-Sheet 1
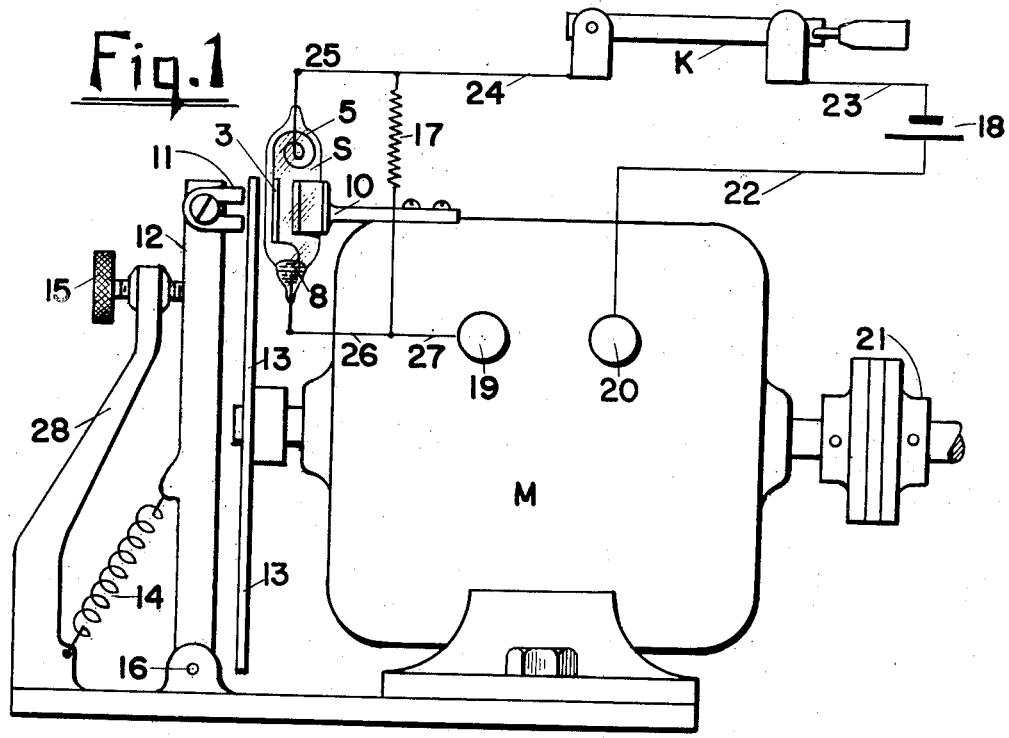
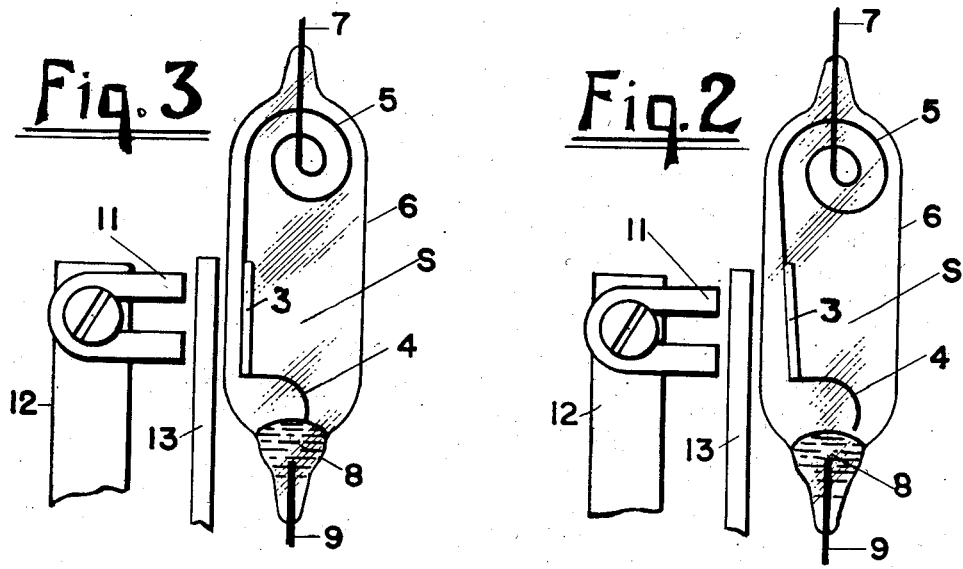
INVENTOR
Fritz Frederick Uehling

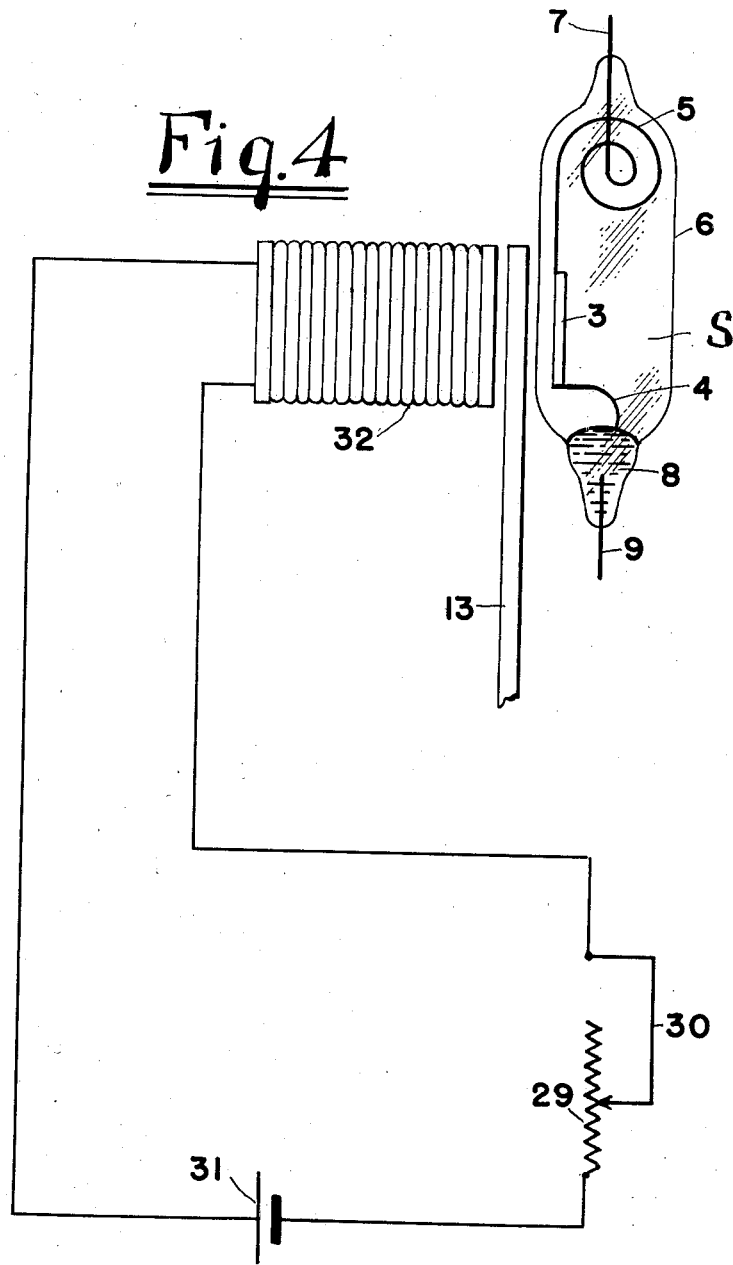

Patented Jan. 16, 1940

2,187,369

UNITED STATES PATENT OFFICE 2,187,369

AUTOMATIC SPEED REGULATOR

Fritz Frederick Uehling, Passaic, N. J.

Application November 16, 1937, Serial No. 174,763

12 Claims. (Cl. 200—92)

Broadly speaking this invention provides a novel method for changing the effect or influence of a magnet on any magnetically responsive element or for changing the influence of magnetic lines of force on any physical or chemical condition, said method consisting fundamentally in continuously moving a copper disc or similar conductor through any magnetic lines of force which are intended to influence a magnetically responsive element or condition, thereby creating eddy currents which react with said lines of force to change their effect on said responsive element or condition in proportion to the rate of speed at which said disc or similar conductor is continuously moving.

For the purpose of illustrating the invention in some concrete form, I have applied the principle involved in said method to the automatic regulation of the speed of a series wound motor in which particular application I utilize a novel magnetic means for opening or closing the circuit through the motor as required to maintain the desired speed, said means consisting of a magnet which reacts with the armature of an armature actuated switch, and a disc or any other similar element which continuously cuts the magnetic lines of force between the magnet and the armature at a rate in proportion to the speed of the motor or any similar device which is being regulated, thus creating eddy currents in the disc which react with the magnetic lines of force to change the effect of the magnet on the armature in proportion to said speed.

Figure 1 is an elevation of said particular form of the invention which illustrates all of the elements thereof including the motor circuit; Figure 2 is an enlarged view of the switch and shows the relative position of the switch armature with respect to the magnet and the disc when the disc is rotating above a predetermined speed; Figure 3 is an enlarged view of the switch and shows the relative position of the switch armature with respect to the magnet and the disc when the disc is rotating below said predetermined speed; Figure 4 illustrates a means for changing the speed of the motor when an electromagnet is substituted for a permanent magnet.

For the purpose of illustration I have shown a series wound motor M, Figure 1, the general characteristics of which are well known and the speed of which may be regulated by opening and closing the energizing circuit in more or less rapid succession to establish the required mean electrical input to maintain the desired speed. The opening and closing of said circuit at the proper frequency to maintain a constant speed is accomplished by means of a magnetic switch S which is fastened to the motor in a fixed position by means of a bracket 10, Figure 1. One of the elements of the switch is an armature 3, Figures 2 and 3, to the lower end of which is fastened a rigid contact extension wire 4. The armature is normally held in the position illustrated in Figure 2 by means of a spiral spring 5 one end of which is sealed into a protecting glass envelope 6, Figures 2 and 3, and protrudes at 7 to serve as one of the switch terminals. In the bottom of the glass envelope is a globule of mercury 8 electrically connected with a wire 9 which protrudes from the bottom of the glass envelope and serves as the second terminal of the switch. A permanent magnet 11, is fastened to an adjustable arm 12, Figure 1, and is so positioned that it will normally react with the armature 3 to cause contact between the contact wire 4 and the globule of mercury 8, Figure 3, thus establishing electrical connection between 7 and 9.

The switch S which is thus normally closed by the magnet 11 is included in the circuit which energizes the motor, Figure 1. This circuit starts at battery 18, thence thorugh wire 23, manually operated switch K and wires 24 and 25 to the magnetically operated switch S, from the switch through wires 26, 27 and terminal 19 to the motor M, and from the motor through terminal 20 and wire 22 back to the battery. A disc 13 made of copper or any other suitable conductor is fastened to the driving shaft of the motor, Figure 1, and extends into the space between the magnet 11 and armature 3 in a plane at right angles to the magnetic lines of force between said magnet and armature. As the disc rotates, eddy currents will be created therein, the magnitude of which will depend upon the flux density between the magnet and the armature and the speed at which the disc is rotating. For any given flux density said eddy currents will obviously have a magnitude in proportion to the speed of the disc and will tend to neutralize or oppose the effect of magnet 11 on the armature 3, said opposition increasing with the speed of the disc. It therefore follows that for every position of magnet 11 with respect to armature 3, there is a disc velocity at which said eddy currents will deflect or oppose the magnetic lines of force sufficiently to reduce the reaction between the magnet 11 and the armature to a point where the magnet will no longer maintain contact between 4 and 8, Figure 2, and that there is a slightly lower disc velocity at which said eddy currents will be sufficiently less to just permit the magnet 11 to establish contact between 4 and 8. In other words for every fixed position of magnet 11 there is a definite speed of the motor or disc 13 below which contact between 4 and 8 will be made and above which contact between 4 and 8 will be broken, with the result that the energizing circuit will be closed to increase the speed of the motor when the motor is operating below said definite speed and opened to decrease the speed of the motor when the motor is operating above said definite speed.

The disc 13 will obviously be at rest when the motor circuit is broken through switch K. Under this condition, namely when the motor is de-energized, the magnetic influence of the magnet 11 on the armature 3, Figure 1, will be sufficient to cause electric contact between 4 and 8, Figure 3, which when switch K is also closed, will complete the circuit through motor M. When the motor is thus initially energized, the disc 13 will rotate at a continuously increasing rate thereby continually increasing the neutralizing effect of said eddy currents until the effect of magnet 11 on armature 3 has been sufficiently reduced to permit the spring 5 to break contact between 4 and 8, Figure 2, thereby opening the circuit through the motor. The opening of the circuit through the motor will immediately reduce the speed of the disc 13 thereby simultaneously reducing said opposing effect of the eddy currents in the disc to again permit sufficient reaction between the magnet 11 and the armature 3 to again establish contact between 4 and 8, Figure 3. The motor will obviously be reenergized immediately that contact is again established between 4 and 8 thereby increasing the speed of the disc until the effect of said eddy currents is again sufficiently reduced to permit the switch S to open as illustrated in Figure 2. The armature 3 will thus be moved back and forth through a comparatively minute distance due to the changing influence of the magnet on the armature thus alternately making and breaking contact between 4 and 8 at the required frequency to maintain the desired speed of the disc 13.

The constant motor speed which is thus controlled by the eddy currents created in the disc as it cuts the magnetic lines of force between the magnet and the armature, will obviously depend upon the distance between the magnet and the armature. The shorter the distance between the magnet and the armature 3, the greater will be the density of the magnetic flux between the magnet and the armature and the greater will be the force with which the armature is attracted. It therefore follows that the nearer magnet 11 is to armature 3 the greater will be the required speed of disc 13 to induce the eddy currents necessary to sufficiently dissipate the reaction between the magnet and the armature to permit the armature spring 5 to break contact between 4 and 8. Similarly the greater the distance between the magnet and the armature the less will be the density of the magnetic flux and the less will be the force with which the armature is attracted. It therefore follows that the farther the magnet is away from the armature the less will be the required speed of the disc to sufficiently dissipate the magnetic lines of force to cause a break in the contact between 4 and 8. Means is therefore provided for adjusting the position of the magnet 11 with respect to the armature 3, said means consisting of an arm 12 pivoted at 16 to which the magnet is fastened as illustrated. The arm is held against an adjustable screw 15 by means of a spring 14 said screw being carried by a fixed bracket 28. It thus follows that by adjusting the screw to move the magnet away from the armature 3 the speed of the motor will be decreased, and by adjusting the screw to move the magnet closer to the armature, the speed of the motor will be increased. The constant speed of the motor may therefore be adjusted by means of screw 15 within wide limits depending primarily upon the strength of the magnet and the opposing force of armature spring 5.

It is obvious from the above that for any fixed position of magnet 11 as adjusted by the screw 15, the motor will operate at a constant speed regardless of changes in the load transmitted through the flexible coupling 21, and regardless of changes in voltage applied at the motor terminals 19 and 20. To exemplify let us assume that the applied voltage has increased. This will immediately increase the speed of the disc. The slightest increase in disc speed will however increase the eddy currents thereby, in the manner stated, permitting the armature to move away from the magnet sufficiently to break contact between 4 and 8, thus reducing the motor speed until it has again assumed the speed for which the screw 15 has been adjusted, after which, as previously described, the switch S will again close and open in rapid succession as required to maintain said speed. In other words, under the higher applied voltage, the characteristics or frequency of armature oscillations will change as required to maintain the speed for which the adjusting screw 15 is set. Similarly if the voltage applied at 19 and 20 is decreased the speed of the disc will immediately decrease. The slightest decrease in disc speed will however decrease the eddy currents thus permitting the magnet to maintain contact between 4 and 8 until the motor has again assumed the speed for which the screw 15 has been adjusted, after which, as previously described, the switch S will again open and close in rapid succession as required to maintain said speed. In other words, under the lower applied voltage, the characteristics or frequency of armature oscillations will change as required to maintain the speed for which the adjusting screw 15 is set. Again if the load transmitted through the flexible coupling 21 decreases, the speed of the disc will immediately increase. The slightest increase in disc speed will, in the manner described, permit the armature 3 to immediately move away from the magnet sufficiently to break contact between 4 and 8 thereby opening the energizing circuit to reduce the motor speed until the disc has again assumed the velocity for which the screw 15 has been adjusted. At the reduced motor speed the armature will again close the motor circuit after which, in the same manner, the armature will obviously continue to alternately open and close the circuit at the proper frequency to maintain said constant speed under the decreased load transmitted through 21. Similarly if the load transmitted through the flexible coupling 21 increases, the speed of the disc will immediately decrease. The slightest decrease in the disc speed will, in the manner described, permit the armature to immediately close the motor energizing circuit thereby increasing the motor speed until the disc has again assumed the velocity for which the screw 15 has been adjusted. The increased motor speed will again permit the armature to open the motor circuit after which, in the manner described, the armature will continue to alternately open and close the circuit at the proper frequency to maintain said constant speed under the increased load transmitted through 21.

In certain forms of this invention it may be highly desirable to provide means for establishing a minimum speed at which the controlled device will operate when the magnetically actuated switch is open. To illustrate such a means in its simplest form I have shown a resistance 17, Figure 1, connected across the switch S which, when said switch is open, will permit sufficient current to flow through the motor to actuate it at a certain low or minimum velocity. Such a resistance also influences the effective inertia of the motor and therefore provides a stabilizing effect on the automatic regulation above described. It is obvious for example that, with the resistance 17 as shown, the opening and closing of switch S due to the oscillation of armature 3, in the manner described, will consecutively decrease and increase the amount of current flowing through the motor between narrower limits than when the resistance 17 is omitted. The effect of alternate changes in the amount of energy supplied to the motor, as caused by the opening and closing of switch S, is therefore more gradual which is particularly advantageous when the mechanical inertia of the motor rotor is low. Although the resistance 17 is not essential in the speed regulation of the average type of motor, it is nevertheless an important part of this invention since by choosing the proper magnitude for this resistance, the ratio of maximum to minimum power input can be fixed to best suit any form of electrically operated rotor particularly when the mass or fly-wheel effect of such a rotor is small. Such a resistance obviously also serves as a spark suppressor to eliminate arcing between 4 and 8 while the armature 3 continues to oscillate during the process of automatic regulation.

Although the magnetic switch as illustrated utilizes a permanent magnet for causing the initial reaction with the armature, it is obvious that an electro-magnet, Figure 4, may be substituted without in any way departing from the novel features of this invention. Furthermore when an electro-magnet is substituted for the permanent magnet 11, it is obvious that the constant speed at which the motor is to operate may be adjusted by changing the amount of current flowing through the electro-magnet by means of a rheostat 29—30, Figure 4, or by any other suitable means instead of adjusting the distance between the magnet and the armature by means of an adjusting screw 15 as illustrated in Figure 1. It is also obvious that any form of magnetically actuated switches or current throttling means, as for example an electronic tube or combination of such tubes capable of changing the flow of current when influenced by magnetic lines of force, may be substituted for the particular type of switch as illustrated without in any way departing from this invention. It is also obvious that, in such cases where the ambient temperature varies sufficiently to affect the conductivity of the rotating disc, said disc may be constructed of constantan, manganin or any other material with a low or zero temperature coefficient.

I claim:

1. In a device of the class described, the combination with a rotatable disc which intersects the magnetic lines of force between a magnet and an armature responsive thereto, of means for continuously rotating the disc to create eddy currents which influence said lines of force, and means for changing the rotating speed of the disc.

2. A magnetically actuated switch comprising a movable armature, a magnet for pulling the armature in one direction to close the switch, a spring for pulling the armature in the opposite direction to open the switch, a disc revolvably mounted in a plane which cuts the magnetic lines of force between the magnet and the armature, and means for rotating the disc through said lines of force to create eddy currents in the disc which react with the magnet to influence its effect on the armature.

3. In a device of the class described, the combination with a magnetically actuated current regulating means, of a magnet which provides the magnetic lines of force for actuating said regulating means, a disc which intersects the magnetic lines of force, means for rotating the disc to create eddy currents which react with said lines of force in influence their effect on the regulating means, and means for changing the velocity of the disc.

4. In a device of the class described, the combination with a movably mounted armature which reacts with a magnet to move in a given direction against the torque of a spring, a switch which is actuated by the armature and which is closed thereby when the reaction between the armature and the magnet overcomes the torque of the spring, and opened thereby when the torque of the spring overcomes the reaction between the armature and the magnet, a disc rotatably mounted for cutting the magnetic lines of force between the magnet and the armature to create eddy currents which influence said lines of force to reduce the reaction between the armature and the magnet, and means for rotating the disc at different speeds to influence said lines of force as required to open or close the switch.

5. In a device of the class described, the combination with a movably mounted armature which reacts with a magnet to move in a given direction against the torque of a spring, a switch which is actuated by the armature and which is closed thereby when the reaction between the armature and the magnet overcomes the torque of the spring, and opened thereby when the torque of the spring overcomes the reaction between the armature and the magnet, a disc rotatably mounted for cutting the magnetic lines of force between the magnet and the armature to create eddy currents which influence said lines of force to reduce the reaction between the armature and the magnet, means for rotating the disc, and independent means for changing the initial reaction between the magnet and the armature said means consisting of a movable arm to which the magnet is fastened, a spring for holding the arm against an adjustable stop, and means for adjusting the stop to change the distance between the magnet and the armature.

6. In a device of the class described, the combination with a fixed electric contact element, of a second electric contact element which forms an integral part of a magnetic armature, a spring which supports the armature and which tends to move the second contact element away from the fixed contact element, a magnet which reacts with the armature to move the second contact element toward the fixed contact against the torque of the spring, a rotatably mounted disc which intersects the magnetic lines of force between the magnet and the armature, means for rotating the disc to create eddy currents in the disc which influence the reaction between the magnet and the armature, and manual means for changing the distance between the magnet and the armature to insure electric contact between the two contact elements for any given speed of the disc.

7. In a device of the class described, the combination with a magnet and flux from which directly influences the position of a resilient armature, of an electric conductor located in the path of the flux, and means for moving the conductor to create currents therein which react with the flux to change its influence on the position of the resilient armature.

8. In a device of the class described, the combination with a magnet, of a movable armature with which the flux of the magnet reacts to pull the armature toward the magnet, a spring the tension of which holds the armature in a given position against the pull of the magnet, a contact piece, manual means for adjusting the position of the magnet with respect to the armature to a point where the magnet will pull the armature against the contact piece against the tension of the spring, a rotatable disc located in a plane through the flux, means for rotating the disc to create eddy currents therein which react with the magnet to influence the flux, and means for regulating the speed of the disc to increase the eddy current influence on the flux as required to permit the spring to pull the armature away from the contact piece.

9. In a device of the class described, the combination with a magnetically responsive means, of an electro-magnet for actuating said responsive means, a rotatable disc which intersects the magnetic flux between the electro-magnet and the magnetically responsive means, means for continuously rotating the disc through the flux of the magnet to create eddy currents which react with said flux to change its effect on said responsive means, and independent means for regulating the current flowing through the electro-magnet to change the density of the flux.

10. In a device of the class described, the combination with a magnetically responsive means for changing a condition, a magnet which provides the flux for actuating the magnetically responsive means, a rotatable disc in the path of the flux for creating eddy currents which influence the flux, and means for rotating the disc at a velocity proportional to changes in the condition.

11. Means for regulating a magnetically actuated controlling means said regulating means consisting of means for creating magnetic lines of force for actuating said controlling means, a disc which intersects said magnetic lines of force, means for continuously rotating the disc to create eddy currents which react with said lines of force to influence their effect on the controlling means, and means for changing the speed of the rotating disc to effect the desired regulation of the controlling means.

12. Means for operating a magnetic switch actuating means including a magnetically responsive element which normally reacts with the lines of force of a magnet to close the switch against the tension of a spring, a disc rotatably mounted in a plane which cuts the lines of force which react with said responsive element, and means for rotating the disc to create eddy currents therein which react with the magnetic lines of force to sufficiently reduce their effect on the responsive element to permit the spring to open the switch.

FRITZ FREDERICK UEHLING.